(12) United States Patent
Yoshida et al.

(10) Patent No.: US 8,927,676 B2
(45) Date of Patent: *Jan. 6, 2015

(54) HEAT ADHERENT POLYURETHANE FILM

(75) Inventors: Satoru Yoshida, Tokyo (JP); Junichi Kojima, Tokyo (JP)

(73) Assignee: Asahi Kasei Fibers Corporation, Osaka-Shi (JP)

( * ) Notice: Subject to any disclaimer, the term of this patent is extended or adjusted under 35 U.S.C. 154(b) by 639 days.

This patent is subject to a terminal disclaimer.

(21) Appl. No.: 12/674,130

(22) PCT Filed: Aug. 20, 2008

(86) PCT No.: PCT/JP2008/064844
§ 371 (c)(1),
(2), (4) Date: Jan. 19, 2011

(87) PCT Pub. No.: WO2009/025303
PCT Pub. Date: Feb. 26, 2009

(65) Prior Publication Data
US 2011/0105682 A1    May 5, 2011

(30) Foreign Application Priority Data
Aug. 21, 2007  (JP) .................................. 2007-215137

(51) Int. Cl.
C08G 18/48 (2006.01)
C08G 18/12 (2006.01)
C08J 5/18 (2006.01)
C08G 18/76 (2006.01)
C08G 18/10 (2006.01)

(52) U.S. Cl.
CPC ......... *C08G 18/4854* (2013.01); *C08J 2375/08* (2013.01); *C08G 18/4858* (2013.01); *C08J 5/18* (2013.01); *C08G 2170/20* (2013.01); *C08G 18/7671* (2013.01); *C08G 18/10* (2013.01)

USPC ............................................ 528/66; 524/590

(58) Field of Classification Search
CPC . C08G 18/48; C08G 18/4854; C08G 18/4858
USPC .............................................................. 528/66
See application file for complete search history.

(56) References Cited

U.S. PATENT DOCUMENTS 4,658,065 A    4/1987  Aoshima et al.
5,912,193 A *  6/1999  Iwata et al. ................... 442/102

(Continued)

FOREIGN PATENT DOCUMENTS

EP    0 579 116 A2    1/1994
EP    1 604 813 A1    9/2004

(Continued)

OTHER PUBLICATIONS

JP 05-032775 machine translation (Feb. 1993, 20 pages).*

(Continued)

*Primary Examiner* — Brieann R Fink
(74) *Attorney, Agent, or Firm* — Finnegan, Henderson, Farabow, Garrett & Dunner, L.L.P.

(57) ABSTRACT

The object of the present invention is to provide a polyurethane film having heat adhesion and further having high stress retention and excellent elastic functions, and the polyurethane film of the present invention is a heat adherent polyurethane film wherein the thermal adhesion peeling stress indicated by a maximum stress when separating a film from a cotton fabric after hot-pressing the film to the cotton fabric at a temperature of 130° C. under a pressure of 4 bar for 25 seconds is 5.88 N/cm or more and the stress retention at an elongation percentage of 200% indicated by a ratio of a stress ($f_R$) in recovery to a stress ($f_S$) in stretching at an elongation percentage of 200% in an S-S curve drawn when the film is stretched to an elongation percentage of 300% and then recovered is 40% or more.

2 Claims, 3 Drawing Sheets

(56) References Cited

U.S. PATENT DOCUMENTS 7,084,207 B2 * 8/2006 Yamana et al. ............... 525/60
7,947,359 B2   5/2011 Suzuka et al.

FOREIGN PATENT DOCUMENTS

| | | |
|---|---|---|
| JP | 2-49022 | 2/1990 |
| JP | 05032775 A * | 2/1993 |
| JP | 05-239177 | 9/1993 |
| JP | 06-218842 | 8/1994 |
| JP | 8-3427 | 1/1996 |
| JP | 8-120231 | 5/1996 |
| JP | 2000-336142 | 12/2000 |
| WO | WO 2004/094136 A1 | 4/2004 |
| WO | WO 2007/016480 A2 | 2/2007 |

OTHER PUBLICATIONS

TW Office Action for Application No. 097131977 dated May 7, 2012.
Database WPI, Thomson Scientific, London, GB: JP 11 170467 A (Miki Tokushu Seishi KK) (XP-002662914 dated Jun. 29, 1999).
Supplementary EP Search Report for corresponding EP Application No. 07707338.5 dated Nov. 22, 2011.
Office Action for Counterpart JP Application No. 2009-529047 dated Aug. 6, 2013.

* cited by examiner

HEAT ADHERENT POLYURETHANE FILM

TECHNICAL FIELD

The present invention relates to a polyurethane film having heat adhesion and good elastic function.

BACKGROUND ART

A polyurethane film has excellent stretchability, for example, has a strength equal to rubber despite being thinner and lighter than rubber, and has high wear resistance, and is excellent in weather resistance and oil resistance compared with rubber. Therefore, the polyurethane film is slit into a tape shape and used for a fastening part at the end of underwear, undergarments, sportswear, such as swimwear and leotards, T-shirts, polo shirts and the like or widely used for inner garments, outer garments, sports garments, garment materials and the like as a reinforcement of cloth for the purpose of suppressing droop of the clothing fabric in place of a cotton or braided tape.

On the other hand, a heat adherent film is slit into a tape shape and used for bonding fabrics together for hemming trousers or for preventing intrusion of rainwater through the sewn part by heat-bonding the tape from the back side of the seamed portion of a waterproof sewn product. The heat adherent film includes a polyurethane type, a polyamide type, a polyester type, a polyethylene type, an ethylene-vinyl acetate copolymer, an ethylene-ethyl acrylate copolymer, an ethylene-atactic polypropylene copolymer, a polyvinyl chloride type, a polyvinyl acetate type, an acryl type and the like, but a polyurethane-type film is excellent in terms of maintaining stretchability, cold resistance, water resistance and soft texture in the vicinity of the seam.

However, more improvements are being demanded for various elastic functions of the heat adherent film. For example, when a heat adherent tape is used for fray prevention in a fastening part at the end of underwear, undergarments, sportswear, such as swimwear and leotards, T-shirts, polo shirts and the like, the fastening force is insufficient due to a small kickback force of the tape. When a high-power tape is used for strengthening the fastening, a hard fabric may result, i.e., it is necessary to have heat adhesion, and elastic functions, be reduced in stress to deformation strain and in the hysteresis loss of stress at expansion and contraction.

A polyether is often used as the soft segment component of a polyurethane resin. Above all, a polyurethane resin using polytetramethylene ether glycol (hereinafter simply referred to as PTMG) which is a polymer of tetrahydrofuran (hereinafter simply referred to as THF) is excellent in the elastic property, low-temperature property, hydrolysis resistance and the like and therefore, is being used in various fields. However, a tape obtained from the polyurethane resin using PTMG is reduced in the elastic functions resulting from crystallization of the soft segment at the stretching. When the polyurethane tape using PTMG is designed as a polymer having a low melting point so as to ensure heat adhesion, this incurs great reduction in the elastic performance of the film.

For the purpose of improving these elastic functions, various efforts have been made with an attempt to suppress the crystallinity of the soft segment in the polyurethane by using various diols, but there are no publications that describes a polyurethane that has succeeded in enhancing the above-described elastic functions to a sufficiently satisfactory level.

For example, there is a publication describing use of a copolymerization-type polyether polyol as the soft segment of the polyurethane. Patent Document 1 describes a polyether glycol in which 4.2 mol % of a neopentyl glycol group is copolymerized, and Patent Document 2 describes a polyurethane using a 3.4 mol % copolymerized polyether glycol, but these polymers have a low copolymerization ratio and a polyurethane remarkably enhanced in the mechanical property when formed into a tape or film shape, such as strength, elongation and elastic recovery percentage, is not disclosed. Furthermore, Patent Document 3 describes a polyurethane using a copolymerized polyol of THF and 3-alkyl tetrahydrofuran but is silent about the hysteresis in the expansion and contraction, and Patent Document 4 describes improvement of elastic functions of a copolymerized polyurethane containing from 8 to 85 mol % of neopentyl glycol group and/or 3-methyl-1,5-pentanediol; however, a thermoplastic polyurethane and heat adhesion are not disclosed.

[Patent Document 1] Japanese Unexamined Patent Publication (Kokai) No. 61-120830
[Patent Document 2] U.S. Pat. No. 4,658,065
[Patent Document 3] Kokai No. 5-239177
[Patent Document 4] Kokai No. 2-49022

DISCLOSURE OF THE INVENTION

Problems to be Solved by the Invention

The present invention has been made resulting from investigations to solve those problems in conventional techniques. Accordingly, an object of the present invention is to provide a polyurethane film having heat adhesion and further having a high stress retention and excellent elastic functions.

Means to Solve the Problems

As a result of intensive studies, the present inventors have accomplished the present invention. In other words, the present invention is as follows.

1. A heat adherent polyurethane film with the thermal adhesion peeling stress defined below being 5.88 N/cm or more and the stress retention at an elongation percentage of 200% defined below being 40% or more:

Thermal Adhesion Peeling Stress:

A maximum stress when separating a film from a cotton fabric after hot-pressing the film to the cotton fabric at a temperature of 130° C. under a pressure of 4 bar for 25 seconds;

Stress Retention at an Elongation Percentage of 200%:

A ratio of a stress ($f_R$) in recovery to a stress ($f_S$) in stretching at an elongation percentage of 200% in an S-S curve drawn when the film is stretched to an elongation percentage of 300% and then recovered, and a value obtained according to the following formula (1):

$$\text{Stress Retention}(\%) = f_R/f_S \times 100 \quad (1)$$

2. The heat adherent polyurethane film according to 1 above, which comprises a polyurethane containing structures obtained from the compounds of (i) and (ii) below:
   (i) an organic polyisocyanate compound, and
   (ii) a polyalkylene ether diol with a molecular weight of 300 to 30,000, comprising structural units represented by the following structural formula (A) and structural formulae (B) and/or (C) and having a composition satisfying the following formula (2):

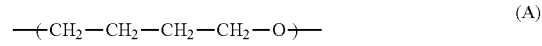

-continued

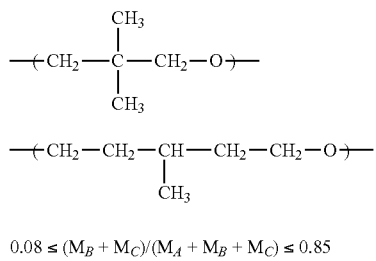

$$0.08 \le (M_B + M_C)/(M_A + M_B + M_C) \le 0.85 \qquad (2)$$

(wherein $M_A$, $M_B$ and $M_C$ are molar numbers of structural units (A), (B) and (C) present in the polyalkylene ether diol).

3. The heat adherent polyurethane film according to 2 above, wherein the polyurethane further contains a structure obtained from a chain extender comprising an active hydrogen-containing compound that reacts with an isocyanate group.

4. The heat adherent polyurethane film according to 3 above, wherein the chain extender comprising an active hydrogen-containing compound that reacts with an isocyanate group is a diol.

5. The heat adherent polyurethane film according to any one of 2 to 4 above, wherein the equivalent ratio ((ii):(i)) of the polyalkylene ether diol (ii) to the organic polyisocyanate compound (i) is from 1:1 to 1:3.0.

6. The heat adherent polyurethane film according to any one of 2 to 5 above, wherein the melting point (fusion initiating temperature) as measured by a flow tester is from 80° C. to less than 130° C.

7. The heat adherent polyurethane film according to 1 above, wherein the add-on amount of an anti-sticking agent such as silicon-based oil agent or lubricant is less than 1%.

Effects of the Invention

According to the present invention, a heat adherent polyurethane film having excellent heat adhesion, having, as excellent elastic functions, (1) small stress to deformation strain and (2) small hysteresis loss of stress at expansion and contraction, and having excellent elastic recoverability is obtained.

BEST MODE FOR CARRYING OUT THE INVENTION

Figure 1:
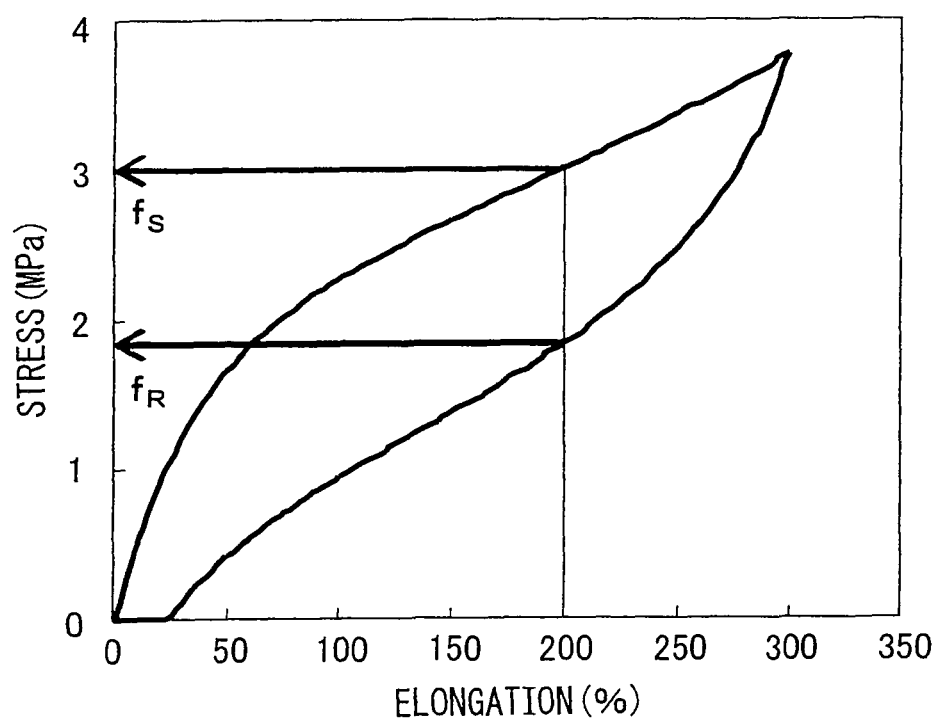
FIG. 1 is an example of the S-S curve drawn when the heat adherent polyurethane film of the present invention is stretched and then recovered.

The present invention is described in detail below.

The present invention is related to a film comprising a heat adherent polyurethane.

The heat adherent polyurethane film of the present invention is characterized by a thermal adhesion peeling stress of 5.88 N/cm or more and a stress retention of 40% or more at an elongation percentage of 200%. The thermal adhesion peeling stress is preferably 9.81 N/cm or more, and the stress retention is preferably 45% or more. If a film having a thermal adhesion peeling stress of less than 5.88 N/cm is used for the fastening part at the end of a shirt instead of sewing, when wearing and laundry are repeated, fraying of the clothing fabric is generated. The upper limit of the thermal adhesion peeling stress is of course preferably as large as possible. If the stress retention is less than 40%, the film is too weak in the fastening force and does not fulfill the function of fastening the shirt end. The upper limit of the stress retention is also preferably as large as possible but in view of production or cost, is about 98%.

Furthermore, the heat adherent polyurethane film of the present invention is characterized in that when designed as a polymer having a low melting point by appropriately selecting the construction described later, not only the heat adhesion is excellent but also the stress retention is high. More specifically, the heat adherent polyurethane film of the present invention needs to satisfy high thermal adhesion peeling stress and high stress retention in bonding at a low temperature (130° C.) and be resistant (heat-resistant) to laundry in use for a garment and preferably has a melting point (elution initiating temperature) of 80° C. to less than 130° C. as measured by a flow tester. The melting point is more preferably from 82° C. to less than 125° C., still more preferably from 85° C. to less than 120° C. In the present invention, despite such a low-melting-point polymer, a film excellent in the elastic performance can be obtained.

In the present invention, as described above, a polyurethane containing a structure obtained by reacting (i) an organic polyisocyanate compound and (ii) a polyalkylene ether diol may be used. Furthermore, (iii) an active hydrogen-containing compound that reacts with an isocyanate group may be used as a chain extender.

The polyalkylene ether diol (ii) for use in the present invention preferably comprises structural units represented by structural formula (A) and structural formulae (B) and/or (C) and has a composition satisfying formula (2), i.e., contains from 8 to 85 mol % of a segment having a methyl group in the side chain. When the segment having a methyl group in the side chain accounts for from 8 to 85 mol %, a heat adherent polyurethane film excellent in various elastic functions, for example, elongation at break and elastic recoverability, can be suitably obtained. The composition is more preferably in a range represented by the following formula (3):

$$0.09 \le (M_B+M_C)/(M_A+M_B+M_C) \le 0.45 \qquad (3)$$

This specific polyalkylene ether diol is produced by reacting THF and, neopentyl glycol and/or 3-methyl-1,5-pentane diol or its dehydrated cyclic low-molecular compound, for example, 3,3-dimethyloxetane, according to the method described in Japanese Unexamined Patent Publication No. 61-123628 while using a heteropolyacid with a controlled hydration number as a catalyst. The copolymerized diol can be easily produced by variously changing the method and conditions of reaction to give predetermined molecular weight, copolymerization component constitution and copolymerization ratio.

Incidentally, the neopentyl glycol unit and/or 3-methyl-1, 5-pentylene unit constituting the diol may be distributed in either random or block manner with respect to the tetramethylene unit. In the reaction using a heteropolyacid catalyst, the units can be distributed in either block or random manner, and the crystallinity of the diol can be changed variously, so that a diol having desired crystallinity can be produced according the property of the polyurethane.

The number average molecular weight of the polyalkylene ether diol for use in the present invention is preferably from 300 to 30,000, more preferably from 500 to 5,000, still more preferably from 900 to 2,000. If the number average molecular weight is less than 300, the film decreases in the elongation and cannot be stretched at wearing, whereas if the number average molecular weight exceeds 30,000, the strength of the film decreases and this is a problem.

The polyalkylene ether diol for use in the present invention may be used as a mixture or in combination, in an arbitrary ratio, with other diols having a number average molecular weight of approximately from 250 to 20,000, for example, with a homopolyether diol such as polyoxyethylene glycol, polyoxypropylene glycol, polyoxytetramethylene glycol and polyoxypentamethylene glycol, a copolymerized polyether diol formed from two or more oxyalkylenes each having a carbon number of 2 to 6, a polyester diol obtained from one species or two or more species of a dibasic acid such as adipic acid, sebacic acid, maleic acid, itaconic acid, azelaic acid and malonic acid, and one species or two or more species of a glycol such as ethylene glycol, 1,2-propylene glycol, 1,3-propylene glycol, 2,2-dimethyl-1,3-propanediol, 1,4-butanediol, 1,3-butanediol, hexamethylene glycol, diethylene glycol, 1,10-decanediol, 1,3-dimethylolcyclohexane and 1,4-dimethylolcyclohexane, a polyesteramide diol, a polyester ether diol, a polylactone diol such as poly-ε-caprolactone diol and polyvalerolactone diol, a polycarbonate diol, a polyacryl diol, a polythioether diol, a polythioester diol, or a copolymerized product of such diols.

Examples of the organic polyisocyanate compound (i) include a compound having at least two or more isocyanate groups within the molecule, such as 4,4'-diphenylmethane diisocyanate, methylene-bis(4-phenyl isocyanate), methylene-bis(3-methyl-4-phenyl isocyanate), 2,4-tolylene diisocyanate, 2,6-tolylene diisocyanate, m- or p-xylylene diisocyanate, α,α,α',α'-tetramethyl-xylylene diisocyanate, m- or p-phenylene diisocyanate, 4,4'-dimethyl-1,3-xylylene diisocyanate, 1-alkylphenylene-2,4- or 2,6-diisocyanate, 3-(α-isocyanatoethyl)phenyl isocyanate, 2,6-diethylphenylene-1,4-diisocyanate, diphenyl-dimethylmethane-4,4-diisocyanate, diphenylether-4,4'-diisocyanate, naphthylene-1,5-diisocyanate, 1,6-hexamethylene diisocyanate, methylene-bis(4-cyclohexyl isocyanate), 1,3- or 1,4-cyclohexylene diisocyanate, trimethylene diisocyanate, tetramethylene diisocyanate, pentamethylene diisocyanate, hexamethylene diisocyanate and isophorone diisocyanate.

Examples of the active hydrogen-containing compound (iii) that reacts with an isocyanate group include: (a) a low molecular weight glycol such as ethylene glycol, 1,2-propylene glycol, 1,3-propylene glycol, 2,2-dimethyl-1,3-propanediol, 1,4-butanediol, 1,3-butanediol, hexamethylene glycol, diethylene glycol, 1,10-decanediol, 1,3-dimethylolcyclohexane and 1,4-dimethylolcyclohexane hydrazine; (b) a compound having a linear or branched, aliphatic, alicyclic or aromatic, active hydrogen-containing amino group having a carbon number of 2 to 10, such as ethylenediamine, 1,2-propylenediamine, trimethylenediamine, hexamethylenediamine, hydrazine, carbodihydrazide, adipic acid dihydrazide and sebacic acid dihydrazide; (c) a monofunctional amino compound such as secondary amine, that is, dimethylamine, methylethylamine, diethylamine, methyl-n-propylamine, methyl-isopropylamine, diisopropylamine, methyl-n-butylamine, methyl-isobutylamine and methylisoamylamine; (d) water; (e) a polyalkylene ether diol having a structure defined in (ii) above; (f) known diols having a number average molecular weight of approximately from 250 to 5,000; and (g) monohydric alcohols. Diols are preferred, and 1,4-butanediol and/or a dialkylene glycol having a carbon number of 4 to 8 are more preferred.

The organic polyisocyanate and active hydrogen-containing compound for use in the present invention each may be used alone, or some may be previously mixed, if desired, and then used.

As for the operation of polyurethanation reaction, known techniques for polyurethanation reaction are used. For example, the polyalkylene ether diol (ii) and the organic polyisocyanate compound (i) may be reacted in a ratio of 1:1.1 to 1:3.0 (equivalent ratio) under the conditions of an excess organic polyisocyanate compound to synthesize a urethane prepolymer, and the active hydrogen-containing compound (iii) that reacts with an isocyanate group may be added and reacted with the isocyanate group in the prepolymer. Alternatively, the organic polyisocyanate compound (i), the polyalkylene ether diol (ii) and the active hydrogen-containing compound (iii) that reacts with an isocyanate group may be reacted by a one-shot polymerization method of simultaneously reacting these in one step.

The ratio of the polyalkylene ether diol to the organic polyisocyanate compound is preferably smaller because the thermal adhesion peeling stress becomes high, and the ratio is more preferably from 1:1.3 to 1:2.0, still more preferably from 1:1.5 to 1:1.9.

These are reacted such that the isocyanate group of the organic polyisocyanate compound becomes nearly equivalent to the total of the hydroxyl group of the polyalkylene ether diol and the active hydrogen of the active hydrogen-containing compound that reacts with an isocyanate.

In the reaction above, a catalyst, a stabilizer and the like may be added, if desired. Examples of the catalyst include triethylamine, tributylamine, dibutyltin dilaurate and stannous octylate, and examples of the stabilizer include other compounds usually used in the polyurethane resin, such as ultraviolet absorbent, antioxidant, light stabilizer, gas-resistant stabilizer, antistatic agent, colorant, matting agent and filler.

Since the polyurethane film is very high in the sticking property, when taking up the film, an oil agent based on polyorganosiloxane or mineral oil, a surfactant, a higher alcohol, a solid fine particle such as talc, silica and colloidal alumina, a lubricant such as higher fatty acid and its metal salt powder, or a wax that is solid at ordinary temperature, such as paraffin and polyethylene, may be attached to the surface. However, because such a silicon-based oil agent or lubricant deteriorates the heat adhesion to clothing fabric, they are preferably used in as a small amount as possible of less than 1% in terms of weight ratio. The weight ratio is preferably 0.9% or less, more preferably 0.5% or less. A state where such an anti-sticking agent is substantially not contained is most preferred. In this case, the film can be prevented from sticking, for example, by a method of winding together an anti-sticking sheet between the film and the film.

The thus-obtained polyurethane can be formed into a film by a known polyurethane extrusion molding method. In the extrusion molding, for example, the film may be extruded directly in a tape shape by using a slit die or the film may be once extruded in a wide sheet shape by using a T-die and then cut into a tape shape having a predetermined width.

The width, thickness and the like of the thus-obtained heat adherent polyurethane film can be arbitrarily selected according to the usage and purpose. The film of the present invention includes also a film shaped into a tape as above. The thickness of the film is usually on the order of 0.02 to 0.5 mm.

EXAMPLES

The present invention is specifically described below. Although the present invention is described in greater detail by referring to Examples, the present invention is not limited only to these Examples. The measured values in Examples and the like are a value determined by the following measuring methods.

Figure 2:
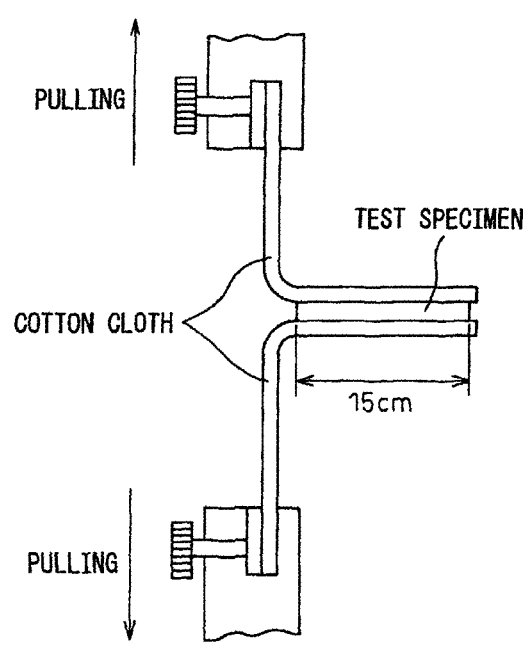
FIG. 2 is a view explaining the separation method of a test sample when measuring the thermal adhesion peeling stress.

Thermal Adhesion Peeling Stress:

A tape-like test specimen having a width of 0.6 cm and a length of 15 cm was produced. This test specimen was sandwiched between two cotton woven fabrics (standard fabric for JIS color fastness test) and heat-pressed at a temperature of 130° C. under a pressure of 4 bar for 25 seconds by using a heat sealer, YSS Model No. 212 (seal width: 0.7 cm, seal length: 10 cm), manufactured by Yasuda Seiki Seisakusho Ltd., and then the specimen and the cotton woven fabric were separated as shown in FIG. 2. The maximum stress at this separation is the thermal adhesion peeling stress. The maximum stress was measured using a tensile tester (UTM-III Model 100, trade name, manufactured by ORIENTEC Co., LTD.) by pulling the test specimen at a rate of 50 cm/min under the condition of 20° C.

Stress Retention at Elongation Percentage of 200%:

Using a tensile tester (UTM-III Model 100, trade name, manufactured by ORIENTEC Co., LTD.), a tape having a width of 0.6 cm and a length of 5 cm was stretched at a rate of 50 cm/min under the condition of 20° C. and then recovered, and the change in the stress-strain was measured. The stress retention at an elongation percentage of 200% is a ratio of, in FIG. 1, a stress ($f_R$) in recovery to a stress ($f_S$) in stretching at an elongation percentage of 200% in an S-S curve drawn when the film is stretched to an elongation percentage of 300% and then recovered, and this is represented by the following formula (4):

$$\text{stress retention(\%) at elongation percentage of 200\%} = (f_R/f_S) \times 100 \quad (4)$$

Measurement of MFR (JIS K 7210 (1995):

Using a melt indexer, Model S-101, manufactured by Toyo Seiki Seisaku-Sho, Ltd., the measurement was performed at 190° C. under a load of 2.16 kg.

Figure 3:
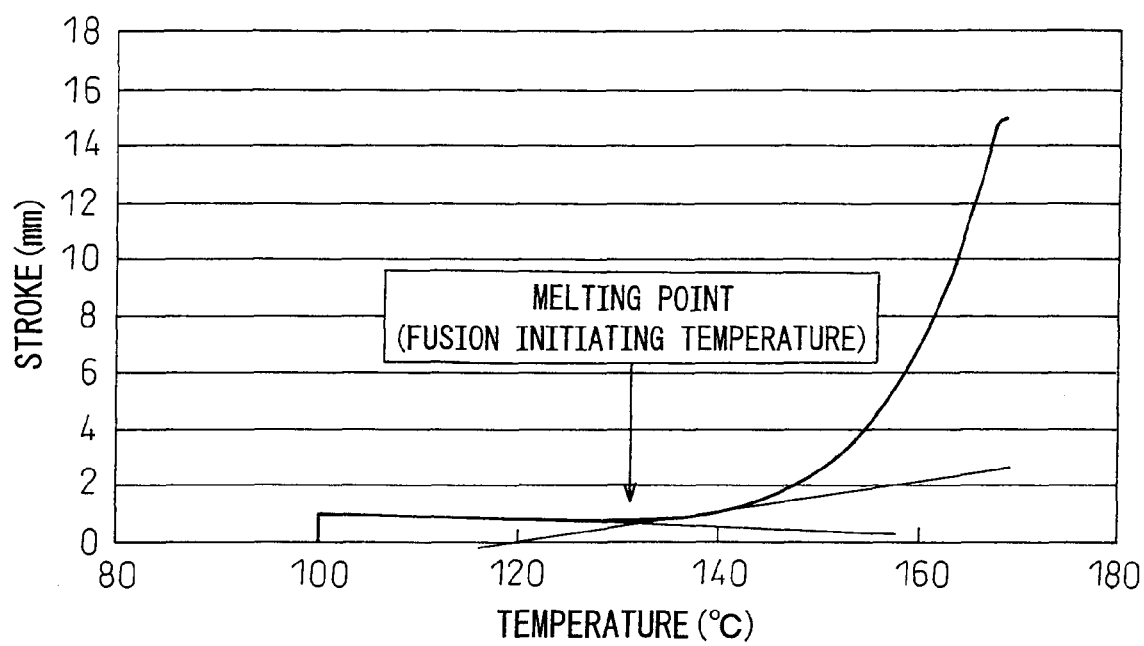
FIG. 3 is a view explaining the method for determining the melting point from a plunger stroke-temperature curve at the flow tester measurement.

Measurement of Melting Point (Elution Initiating Temperature):

Using Shimadzu Flow Tester Model CFT-500D (manufactured by Shimadzu Corp.), under the conditions of a sample amount of 1.5 g, a die (nozzle) diameter of 0.5 mm and a die thickness of 1.0 mm, an extrusion load of 294N was added, preheating was preformed at an initial set temperature of 100° C. for 240 seconds, the temperature was isokinetically raised at a rate of 3° C./rain, and the plunger stroke-temperature curve drawn there was determined. As the temperature was isokinetically raised, the sample was gradually heated, and the polymer started flowing out. The temperature at this time was taken as a melting point (fusion initiating temperature). More specifically, as shown in FIG. 3, the intersection between the tangent line in the rising part of the plunger stroke-temperature curve and the tangent line at the point where the gradient before rising becomes minimum was determined and taken as the fusion initiating temperature.

Example 1

As the polyalkylene ether diol, PTXG1800 produced by Asahi Kasei Fibers Corp. was used. The copolymerization composition $M_B/(M_A+M_B)$ of PTXG1800 was 0.1. In a nitrogen gas stream, 1,500 g of this PTXG and 365 g of 4,4'-diphenylmethane diisocyanate were reacted under stirring at 80° C. for 180 minutes to obtain a polyurethane prepolymer having an isocyanate group at both terminals. This prepolymer was then rapidly cooled to 25° C., and 56.3 g of 1,4-butanediol was added to the prepolymer and stirred for 30 minutes. A polyurethane having a viscosity of 190,000 mPa·s (25° C.) was obtained.

The polyurethane obtained was mixed with 9 g of AO-60 produced by Adeka Corp. as an antioxidant and 9 g of LA-36 produced by Adeka Corp. as a yellowing inhibitor and then discharged to a Teflon (registered trademark) tray.

The polyurethane in the Teflon (registered trademark) tray was annealed in a hot air oven at 130° C. for 3 hours to obtain a polyurethane resin. This polyurethane resin had a Shore A hardness of 61, an MFR (190° C.) of 8.0 and a thermoplastic property.

The polyurethane resin obtained above was ground into a powder having a diameter of about 3 mm by a grinder, Model UG-280, manufactured by Horai K.K.

This polyurethane resin powder was melt-extruded into a shaped form by a twin-screw extruder, KZW15TW-45HG, manufactured by TECHNOVEL Corp. The melt was extruded into a film shape at a discharge rate of 12.4 g/min from a T-die with a width of 150 mm and a lip width of 1.0 mm at a die temperature of 200° C. The film was taken up by a metal roll cooled to 15° C., at a roll speed of 0.5 m/min to obtain a film having a thickness of 250 μm.

When taking up the film by a roll, a 0.2 mm-thick NAFLON sheet produced by NICHIAS Corp. was wound together to prevent the films from sticking to each other.

This film was subjected to slitting to obtain a tape of 6 mm in width.

The thermal adhesion peeling stress of the tape was 46.1 N/cm and good. Also, the stress retention at an elongation percentage of 200% was 62.3% and good. The melting point (elution initiating temperature) of this tape was 114° C.

Example 2

The polyurethane tape obtained in Example 1 was heat-bonded at 130° C. to the tail portion of a circular-knitted cotton shirt to be shut in between clothing fabrics. The shirt was worn and washed every day, and this was repeated for 1 week, but peeling off of the clothing fabric was not generated and the state was good. Fastening was good and there was no problem in wear comfort.

Comparative Example 1

As the polyalkylene ether diol, PTMG 1,000 produced by Asahi Kasei Fibers Corp. was used. In a nitrogen gas stream, 1,400 g of this PTMG and 490.6 g of 4,4'-diphenylmethane diisocyanate were reacted under stirring at 80° C. for 180 minutes to obtain a polyurethane prepolymer having an isocyanate group at both terminals. This prepolymer was then cooled to 25° C., and 50.4 g of 1,4-butanediol was added to the prepolymer and stirred for 30 minutes. A polyurethane having a viscosity of 180,000 mPa·s (25° C.) was obtained.

The polyurethane obtained was mixed with 9 g of AO-60 produced by Adeka Corp. as an antioxidant and 9 g of LA-36 produced by Adeka Corp. as a yellowing inhibitor and then discharged to a Teflon (registered trademark) tray.

The polyurethane in the Teflon (registered trademark) tray was annealed in a hot air oven at 130° C. for 3 hours to obtain a polyurethane resin. This polyurethane resin had a Shore A hardness of 60, an MFR (190° C.) of 7.8 and a thermoplastic property.

The polyurethane resin obtained above was ground into a powder having a diameter of about 3 mm by a grinder, Model UG-280, manufactured by Horai K.K.

This polyurethane resin powder was melt-extruded into a shaped form by a twin-screw extruder, KZW15TW-45HG, manufactured by TECHNOVEL Corp. The melt was extruded into a film shape at a discharge rate of 12.4 g/min from a T-die with a width of 150 mm and a lip width of 1.0 mm at a die temperature of 200° C., and the film was taken up by a metal roll cooled to 15° C., at a roll speed of 0.5 m/min to obtain a film having a thickness of 250 μm. When taking up the film by a roll, a 0.2 mm-thick NAFLON sheet produced by NICHIAS Corp. was wound together to prevent the films from sticking to each other.

This film was subjected to slitting to obtain a tape of 6 mm in width.

The thermal adhesion peeling stress of the tape was 39.3 N/cm and good, but the stress retention at an elongation percentage of 200% was 37%, revealing bad fastening force. This polyurethane tape was heat-bonded at 130° C. to the tail portion of a circular-knitted cotton shirt to be shut in between clothing fabrics. The shirt was worn and washed every day, and this was repeated for 1 week, as a result, puckering of the clothing fabric was disadvantageously generated.

INDUSTRIAL APPLICABILITY

The heat adherent polyurethane film of the present invention has heat adhesion and good elastic functions and therefore, when this film is used as an end-fastening material of clothing fabric, a garment or the like assured of soft stretching, appropriate fastening force and good ravel prevention can be suitably obtained.

The invention claimed is:

1. A heat adherent polyurethane film for using as a garment with a thermal adhesion peeling stress defined below being 5.88 N/cm or more, a the stress retention at an elongation percentage of 200% defined below being 40% or more and a melting point (fusion initiating temperature) as measured by a flow tester being from 80° C. to less than 130° C.:

Thermal Adhesion Peeling Stress:
A maximum stress when separating a film from a cotton fabric after hot-pressing the film to the cotton fabric at a temperature of 130° C. under a pressure of 4 bar for 25 seconds;

Stress Retention at an Elongation Percentage of 200%:
A ratio of a stress ($f_R$) in recovery to a stress ($f_S$) in stretching at an elongation percentage of 200% in an S—S curve drawn when the film is stretched to an elongation percentage of 300% and then recovered, and a value obtained according to the following formula (1):

$$\text{Stress Retention (\%)} = f_R/f_S \times 100 \quad (1)$$

wherein the heat adherent polyurethane film comprises a polyurethane containing structures obtained from the compounds of (i) and (ii) below:
(i) an organic polyisocyanate compound, and
(ii) a polyalkylene ether diol with a molecular weight of 300 to 30,000, comprising structural units represented by the following structural formula (A) and structural formulae (B) and/or (C) and having a composition satisfying the following formula (2):

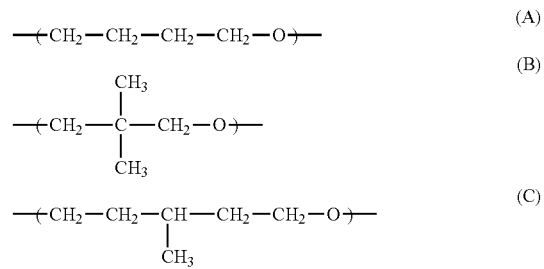

$$0.08 \leq (M_B + M_C)/(M_A + M_B + M_C) \leq 0.85 \quad (2)$$

(wherein $M_A$, $M_B$ and $M_C$ are molar numbers of structural units (A), (B) and (C) present in the polyalkylene ether diol), the equivalent ratio ((ii):(i)) of the polyalkylene ether diol (ii) to the organic polyisocyanate compound (i) is from 1:1 to 1:3.0, the polyurethane further contains a structure obtained from a chain extender comprising an active hydrogen-containing compound that reacts with an isocyanate group, and the chain extender is a diol.

2. The heat adherent polyurethane film according to claim 1, wherein an add-on amount of an anti-sticking agent selected from silicon-based oil agent or lubricant is less than 1%.